Patented Nov. 9, 1943

2,334,097

UNITED STATES PATENT OFFICE 2,334,097

WATER PAINT

Arthur M. Howald and John A. Murray, Toledo, Ohio, assignors, by mesne assignments, to Libbey-Owens-Ford Glass Company, a corporation of Ohio No Drawing. Application July 10, 1940, Serial No. 344,735

6 Claims. (Cl. 260—29)

The invention relates to a quick-drying water paint containing a formaldehyde-urea reaction product, and particularly to a stable water-color paste that is converted by addition of water into a self-hardening paint which becomes insoluble after being applied, to produce a washable coating.

The paints used at present for interior decorating are made up of pigment, a drying oil and an organic solvent or thinner, such as turpentine. Two important disadvantages of such paints are, first, that they take twenty-four hours or more to become entirely dry to the touch, and, second, that the disagreeable odor of the organic solvent or thinner persists for many days after the paint has been applied. Many apartments in which the average tenancy is about one year are redecorated after being vacated by each tenant. The odor of the thinners used in present interior paints is so persistent that an apartment is not habitable until about two weeks after it has been painted, so that there is a loss of two weeks' rent after each tenancy.

Ordinary calcimine is a water paint, but it cannot be utilized for interior decorating, because it rubs off when touched, and is washed off by cold water.

The principal object of the invention is to provide a stable water-color paste that is converted by addition of water into a self-hardening paint, which is dry to the touch immediately after being applied, does not leave an odor, and rapidly becomes insoluble, to form a washable coating that cannot be rubbed off. More specific objects and advantages are apparent from the description, which merely discloses and illustrates the invention and is not intended to impose limitations upon the claims.

The most important use of the present water paint is for finishing walls in interior decorating. For such finishing is used a flat, as distinguished from a gloss paint, i. e., a paint containing a very high proportion of pigment.

When an ordinary aqueous solution of a formaldehyde-urea reaction product is diluted with water beyond a certain point, the reaction product precipitates. Thus, when a flat paint is prepared from an ordinary aqueous solution of a formaldehyde-urea reaction product and a large proportion of pigment, a sufficient amount of water to render the paint thin enough to be applied cannot be used without causing precipitation of the formaldehyde-urea reaction product. Such precipitation produces a mere suspension of the precipitated particles of reaction product in the water, which is not a true coating composition because it leaves a layer of powder rather than a continuous film upon drying.

Moreover, an ordinary aqueous solution of a formaldehyde-urea reaction product is not satisfactory in a water-color paint for general distribution, because such a solution remains stable only a few weeks at the most, after which precipitation or gelling takes place. In order to be salable to the general public, a paint must be capable of remaining in its original container for a year or two without deterioration.

When such an aqueous solution is used in a water-color paint, the hardening agent cannot be added until just before the composition is applied as a coating, because the formaldehyde-urea reaction product in the solution rapidly becomes converted into the insoluble state after the hardening agent has been added. A coating composition to which a measured amount of hardening agent must be added just before application is not satisfactory for sale to the general public, because the ordinary user of the paint cannot be trusted to measure out the correct amount of hardening agent for each batch of the paint.

In carrying out the present invention, a water-color paste is prepared comprising a hardening agent, a pigment, and a solution of a water-soluble alkylated formaldehyde-urea reaction product in a water-soluble organic solvent, the paste being capable of dilution with water, without substantial precipitation of the reaction product, to form a self-hardening coating composition that produces a washable coating. This paste remains stable for an indefinite period of time, and does not suffer appreciable deterioration in a period of two years.

The term "water-soluble alkoxy-substituted formaldehyde-urea reaction product" as used herein means any water-soluble product obtained by reacting a formaldehyde-urea reaction product with an alcohol or acetal in the presence of a catalyst, or by reacting formaldehyde and urea in the presence of an alcohol and a catalyst. The catalyst usually employed in these reactions is an organic acid, although an inorganic acid or other catalyst may be employed. When a formaldehyde-urea reaction product is reacted with an alcohol or acetal, it is believed that hydroxy groups in the molecule of the formaldehyde-urea reaction product are converted into alkoxy groups. When urea and formaldehyde are reacted in the presence of an alcohol and a catalyst, it is believed that a formaldehyde-urea reaction product forms and then reacts with the alcohol.

The solution of a water-soluble alkoxy-substituted formaldehyde-urea reaction product in a water-soluble organic solvent remains stable in a water-color paste embodying the invention until water is added to render the composition thin enough to be applied as a coating. It is believed that after the water is added, the alkoxy-substituted formaldehyde-urea reaction product hydrolyzes upon dissolving in the water, and that alkoxy groups in the molecule of the alkoxy-substituted reaction product are thereby converted into hydroxy groups. After the addition of the water, the hardening agent causes the hardening or gelling of the formaldehyde-urea reaction product to begin. Thus, if the coating composition is applied after addition of the water, the resulting coating becomes insoluble or washable as the formaldehyde-urea reaction product hardens and is converted into the insoluble state. Although formaldehyde and urea can be reacted in the presence of an alcohol and a catalyst in order to obtain a water-soluble alkoxy-substituted formaldehyde-urea reaction product for use in preparing a water paint in accordance with the invention, the alkoxy-substituted product is preferably obtained by first preparing a formaldehyde-urea reaction product and then reacting such product with an alcohol in the presence of a catalyst.

In the preferred procedure for preparing a water-soluble alkoxy-substituted formaldehyde-urea reaction product, formaldehyde and urea are first reacted in an aqueous solution. If an alcohol as well as an acid or other suitable catalyst is present at the beginning of this reaction, the reaction product of formaldehyde and urea that is formed will react with the alcohol to produce an alkoxy-substituted product. However, it is preferable not to add an alcohol to this aqueous solution, and to carry the reaction in the aqueous solution to a point, beyond the methylol-urea stage, at which the resulting condensation product is still water-soluble. The aqueous solution of the formaldehyde-urea condensation product may then be evaporated in any desired apparatus, such as a spray-drier or vacuum drum-drier, to permit the condensation product to be recovered in solid form. In order to facilitate such evaporation, it is desirable to arrest the reaction and commence the evaporation while the reaction product is still water-soluble, and before it has precipitated from the aqueous solution. When the solid condensation product is dissolved in a water-soluble organic solvent comprising an alcohol in the presence of a suitable catalyst, the condensation product reacts with the alcohol, and a substantially stable solution of an alkoxy-substituted formaldehyde-urea reaction product in the organic solvent is obtained.

The alcohol with which a formaldehyde-urea reaction product is reacted in order to produce an alkoxy-substituted product should be such that the resulting alkoxy-substituted product is soluble in water. Ethyl alcohol, propyl alcohol, methyl cellosolve, ethylene glycol, and other alcohols of low molecular weight may be used for this reaction, but methyl alcohol is preferred.

The formaldehyde-urea reaction product that is reacted with an alcohol in order to produce an alkoxy-substituted product is not necessarily a water-soluble formaldehyde-urea reaction product. A water-soluble alkoxy-substituted formaldehyde-urea reaction product can be obtained by reacting an alcohol with a formaldehyde-urea condensation product that has been condensed beyond the water-soluble stage. For example, a water-soluble product obtained by spray-drying an aqueous solution of a formaldehyde-urea condensation product may be baked at a temperature of 100° C. until it is no longer soluble in water. When 100 parts by weight of the resulting insoluble product is dissolved in 200 parts of methanol at 65° C. with rapid agitation in the presence of just sufficient maleic acid (about 2 parts) to cause a solution to be formed, a methanol solution of a water-soluble alkoxy-substituted formaldehyde-urea reaction product is obtained.

Although the formaldehyde-urea reaction product that is reacted with an alcohol to produce a water-soluble alkoxy-substituted formaldehyde-urea reaction product is preferably a reaction product that has been condensed in aqueous solution to a point beyond the methylol-urea stage, other formaldehyde-urea reaction products, such as dimethylol-urea, may be employed if desired. However, a considerable amount of water is evolved in the reaction of dimethylol-urea with an alcohol, and when a solution is obtained by merely dissolving dimethylol-urea in an alcohol in the presence of a catalyst, distillation or some other method can be used to remove water from the solution. The term "substantially anhydrous" as used herein to describe a composition containing an alkoxy-substituted formaldehyde-urea reaction product means a composition that does not contain sufficient water to impair appreciably its stability.

The water-soluble organic solvent in which the water-soluble alkoxy-substituted formaldehyde-urea reaction product is dissolved, in a water-color paste embodying the invention, may be cellosolve, methyl cellosolve, ethanol, or another water-soluble alcohol. The water-soluble organic solvent may consist of a combination of solvents such as methanol and acetone. A nonvolatile water-soluble organic solvent such as ethylene glycol may be used in the proper proportion to serve as a plasticizer in the finished coating. Methanol is preferred as the water-soluble organic solvent, because it is highly volatile, because it is miscible with water in all proportions, and because it reacts with a formaldehyde-urea condensation product more readily than most alcohols, and is capable of forming a more concentrated solution of the resulting alkoxy-substituted product, which seems to tolerate a greater concentration of water without becoming appreciably unstable.

The water-soluble organic solvent that is used does not need to be miscible in all proportions with water. However, the solvent selected should be sufficiently water-soluble, and the proportion of solvent contained in the paste should be such, that the addition of the amount of water necessary to produce a paint of a consistency that can be applied causes the organic solvent to become largely dissolved in the water. It is preferable that an organic solvent be selected which is sufficiently volatile so that the odor of the organic solvent does not persist after the coating has dried. The amount of the water-soluble organic solvent that is employed in a water-color paste embodying the invention is simply the amount necessary to produce a paste of the desired consistency.

In a water-color paste embodying the invention, the pigment is preferably finely dispersed in the organic solution of the alkoxy-substituted formaldehyde-urea reaction product so that the addition of water will produce a uniform, fine dispersion of the pigment in the aqueous solution. A suitable dispersion of the pigment in the organic solution can be prepared by means of a dispersing apparatus, such as a ball mill, roller mill, or colloid mill. A paste of the proper consistency can be obtained directly from the dispersing apparatus if an organic solution of the proper concentration is introduced along with the pigment. The proportion of pigment used in a water-color paste embodying the invention depends on whether a glossy finish or a flat finish is desired. A glossy finish can be obtained by the use of approximately equal parts by weight of the pigment and the alkoxy-substituted formaldehyde-urea reaction product, and a flat finish can be obtained by the use of from 2 to 6 parts by weight of pigment for each part of the alkoxy-substituted formaldehyde-urea reaction product.

In order to prepare a coating composition, a large amount of paste containing a white pigment is ordinarily mixed with a small amount of paste containing a colored pigment. The mixed paste is then diluted with water, to prepare a coating composition that is thin enough to suit the method of application, such as brushing or spraying.

The hardening agent is a substance that renders acid the aqueous solution that is prepared by adding water to a water-color paste embodying the invention. An acid, an acid salt, or a substance that liberates acid upon the addition of the water may be used as the hardening agent. If desired, the hardening agent may be an acid which is present at the time the alkoxy-substituted formaldehyde-urea reaction product is formed, and which serves as the catalyst in the reaction by which that product is obtained. The amount of hardening agent used in the paste is simply an amount sufficient to cause hardening or gelling to take place with the desired speed after the paste has been diluted with water and applied as a coating, i. e., sufficient to cause the coating to become insoluble or washable with the desired rapidity after being applied. Of course it is undesirable to use an acid in an amount so great that the composition hardens too rapidly after the addition of the water to allow any time for applying it.

A water paint embodying the invention dries rapidly, and is dry to the touch about 1 hour after it is applied.

*Example*

1 mol of urea is added to a 37 per cent aqueous solution containing 2 mols of formaldehyde that has been brought to pH 4.5–5.5 by means of sodium hydroxide. The solution is then gently refluxed long enough (about 1 hour) to carry the condensation to a suitable stage, after which the solution is neutralized. It is then evaporated in a suitable apparatus, such as a spray-drier or vacuum drum-drier, to obtain a solid condensation product. About 1 part of maleic acid is dissolved in 40 parts of methanol, and the resulting solution is heated to about 60° C. Then, after the addition of 60 parts of the solid condensation product, the liquid is agitated until a solution is formed. Thus there is obtained a methanol solution of an alkoxy-substituted formaldehyde-urea reaction product that is stable because of the ability of a methanol solution to tolerate an unusually high water content without becoming unstable. An analysis of this solution shows that it contains about 12 per cent of water. Passing this solution, together with 125 parts of titanium oxide pigment, twice through a three-roller mill produces a thick water-color paste that does not deteriorate appreciably in two years at ordinary temperatures. The addition of 125–250 parts of water to this paste produces a water-color paint of brushing or spraying consistency that can be applied satisfactorily at any time within three or four days after the addition of the water. The resulting coating is a flat finish that has covering properties, sheen, and surface appearance equal to that of the best oil paints, does not dust off, and becomes insoluble or washable about 2 weeks after being applied.

In the foregoing example, the proper acidity may be obtained by using an acid substance other than maleic acid, but most inorganic acids are so strong that it is difficult to measure out the proper quantity, an organic acids such as maleic, oxalic or phthalic are preferred.

Having described our invention, we claim:

1. A stable water-color paste comprising a hardening agent capable of acidifying the composition at ordinary temperatures, a pigment, and a solution of a water-soluble alkoxy-substituted formaldehyde-urea reaction product in a volatile water-soluble organic solvent, said solution containing not more than about one-eighth of its weight of water, and said paste being capable of dilution with water, without substantial precipitation of said reaction product, to form a self-hardening coating composition that produces a washable coating.

2. A stable water-color paste comprising a hardening agent capable of acidifying the composition at ordinary temperatures, a pigment, and a solution, in a volatile water-soluble organic solvent, of a water-soluble reaction product of an alcohol with a formaldehyde-urea reaction product that has been condensed in an aqueous solution to a point beyond the methylol-urea stage, said solution containing not more than about one-eighth of its weight of water, and said paste being capable of dilution with water, without substantial precipitation of said reaction product, to form a self-hardening coating composition that produces a washable coating.

3. A stable water-color paste comprising a hardening agent capable of acidifying the composition at ordinary temperatures and a dispersion of a pigment in a methanol solution of a water-soluble reaction product of methanol with a formaldehyde-urea reaction product that has been condensed in an aqueous solution to a point beyond the methylol-urea stage, said methanol solution containing not more than about one-eighth of its weight of water, and being capable of dilution with water, without substantial precipitation of said reaction product, to form a self-hardening coating composition that produces a washable coating.

4. A stable water-color paste comprising a hardening agent capable of acidifying the composition at ordinary temperatures and a dispersion of a pigment in a methanol solution of a water-soluble alkoxy-substituted formaldehyde-urea reaction product, said methanol solution containing not more than about one-eighth of its weight of water, and being capable of dilution with water, without substantial precipitation of said reaction product, to form a self-hardening coating composition that produces a washable 5. A method of preparing a stable water-color paint that includes preparing a paste comprising a hardening agent capable of acidifying the composition at ordinary temperatures and a dispersion of a pigment in a solution of a water-soluble alkoxy-substituted formaldehyde-urea reaction product in a volatile water-soluble organic solvent by means of a dispersing apparatus, said solution containing not more than about one-eighth of its weight of water, and said paste being capable of dilution with water, without substantial precipitation of said reaction product, to form a self-hardening coating composition that produces a washable coating.

6. A stable water-color paste comprising a hardening agent capable of acidifying the composition at ordinary temperatures and a dispersion of from about two to about six parts of a pigment in a solution of one part of a water-soluble alkoxy-substituted formaldehyde-urea reaction product in a volatile water-soluble organic solvent, said solution containing not more than about one-eighth of its weight of water, and said paste being capable of dilution with water, without substantial precipitation of said reaction product, to form a self-hardening coating composition that produces a washable coating.

ARTHUR M. HOWALD.
JOHN A. MURRAY.